United States Patent [19]

Uenohara

[11] Patent Number: 5,697,846
[45] Date of Patent: Dec. 16, 1997

[54] DAMPER DISC ASSEMBLY

[75] Inventor: Norihisa Uenohara, Ibaraki, Japan

[73] Assignee: Exedy Corporation, Osaka, Japan

[21] Appl. No.: 666,697

[22] Filed: Jun. 18, 1996

[30] Foreign Application Priority Data

Jun. 30, 1995 [JP] Japan .................. 7-165538

[51] Int. Cl.$^6$ ........................... F16D 3/66
[52] U.S. Cl. .................. 464/64; 192/212; 464/68
[58] Field of Search .................. 464/64, 66, 67, 464/68; 192/213.31, 212, 213, 213.22; 74/574

[56] References Cited

U.S. PATENT DOCUMENTS

| | | | |
|---|---|---|---|
| 2,124,013 | 7/1938 | Spase | 192/212 |
| 2,251,128 | 7/1941 | Goodwin | 192/212 |
| 4,580,672 | 4/1986 | Caray | 464/64 X |
| 4,601,676 | 7/1986 | Tojima et al. | 464/64 X |
| 5,013,281 | 5/1991 | Graton et al. | 464/68 |
| 5,257,687 | 11/1993 | Cooke | 464/68 |

*Primary Examiner*—Eileen A. Dunn
*Attorney, Agent, or Firm*—Shinjyu Office of Patent Attorney

[57] ABSTRACT

A clutch plate (4) and a retaining plate (5) are disposed to face each other. A separate flange (3) is interposed between the two plates and has cutaways (3d) extending in the circumferential direction at its outer circumferential edge. Large coil springs (7) couple the two plates and the separate flange (3) with each other in the circumferential direction. A plate coupler (30) includes a sleeve portion (31) and fastener portions (32) for coupling outer circumferential portions of the two plates with each other, and projections (33) extending radially inwardly from the sleeve portion (31) and contactable with both ends in the circumferential direction of the cutaways 3d of the separate flange (3) to overcome the problems associated with conventional stop pins and to increase a relative twist angle between an input member and an output member.

16 Claims, 3 Drawing Sheets

DAMPER DISC ASSEMBLY

BACKGROUND OF THE INVENTION

A. Field of the Invention

The present invention relates to a damper disc assembly, in particular, the present invention relates to a damper disc assembly having a plate coupling configuration for connecting various parts of the assembly.

B. Description of the Related Art

Typically, s damper disc assembly used in a clutch disc of an automotive vehicle is provided with a pair of input plates disposed to face each other, an output hub having a flange formed on an outer circumference extending radially outward, and an elastic member for elastically coupling the pair of input plates and the flange in the circumferential direction. The pair of input plates are fixed to each other at outer circumferential portions by a plurality of stop pins for rotation as a single unit. The stop pins extend through cutaways formed in the outer circumferential edges of the flange. Although the pair of input plates and the flange are rotatable relative to each other within a predetermined angular range, when the stop pins are brought into contact with the cutaways of the outer circumferential edges, the relative rotation of these components is stopped.

In the conventional clutch disc assembly, the stop pins are used as members for limiting the relative rotation between the input plates and the flange. The stop pins are required to have a predetermined diameter and by their inherent structure must be positioned radially inward of the outer circumferential edges of the pair of input plates. Due to such requirements to provide the stop pins, it is very difficult to sufficiently increase a relative twist angle between the pair of input plates and the flange. This means that even if springs having a high strength are used, unless a sufficient relative twist angle is obtained, it is impossible to utilize the performance of the springs at maximum.

SUMMARY OF THE INVENTION

In order to overcome the above-noted defect inherent in the use of conventional stop pins, one object of the present invention is to configure a damper disc assembly with an increased in the relative twist angle between the input plates and the output member as compared to a damper disc assembly having conventional stop pins.

In accordance with on aspect of the present invention, a damper disc assembly includes a pair of first disc members that are facing each other and a second disc member disposed between the pair of first disc members, concentric therewith, the second disc member having at least one cutaway formed on an outer circumferential edge thereof extending in a circumferential direction. The damper disc assembly further includes at least one elastic member elastically connecting the first disc members and the second disc member in the circumferential direction and a plate coupler coupling an outer circumferential portion of each of the pair of first disc members to each other, the plate coupler formed with a radially inwardly extending protrusion which extends into the cutaway of the second disc member, the inwardly extending protrusion being engageable with either circumferencial end of the cutaway for limiting relative rotary displacement of the second disc member with respect to the first disc members.

In one embodiment, the plate coupler is a discrete member connected to each of the pair of first disc members.

Preferably, the plate coupler is formed with an annular sleeve extending from one of the pair of first disc members toward an outer circumferential edge of a second one of the pair of first disc members, the plate coupler being formed with fastener portions which extend radially inward from the annular sleeve, the fastener portions being fixed to the pair of first disc members.

In another embodiment, the plate coupler is formed integrally with the outer circumferential portion of one of the pair of first disc members and extends axially therefrom.

Preferably, the plate coupler is formed with a plurality of fastener plates for coupling one of the pair of first disc members with a second one of the first disc members.

Preferably, the second disc member is formed about a central hub.

Preferably, each of the first disc members is formed with at least one first window and the second disc member is formed with at least one second window and the elastic member is disposed in the first and second windows.

In accordance with another aspect of the present invention, a damper disc assembly includes a pair of first disc members opposing each other, each first disc member being formed with windows therein, a hub having a radially extending flange extending therefrom, the flange defining a second disc member, the second disc member disposed between the pair of first disc members and also concentric therewith, the second disc member formed with at least one cutaway formed on an outer circumferential edge which extends a predetermined circumferential distance and also extend radially inwardly a predetermined distance, the second disc member also formed with a plurality of windows radially inwardly from the cutaway and elastic members, at least one of the elastic members disposed in each of the windows in the first disc member and the windows in the second disc member for connecting the first disc members and the second disc member in the circumferential direction. The damper disc assembly further includes an annular plate coupler for coupling an outer circumferential portion of the pair of first disc members to each other, the plate coupler being contactable with both ends in the circumferential direction of the cutaways of the second disc member.

In accordance with one embodiment of the present invention, the plate coupler is a discrete member connected to each of the pair of first disc members.

Preferably, the plate coupler includes an annular sleeve extending from one of the pair of first disc members toward an outer circumferential edge of a second one of the pair of first disc members, the plate coupler being formed with fastener portions which extend radially inward from the annular sleeve, the fastener portions being fixed to the pair of first disc members.

In accordance with another embodiment of the present invention, the plate coupler is formed integrally with the outer circumferential portion of one of the pair of first disc members and extends axially therefrom.

Preferably, the plate coupler includes a plurality of fastener plates for coupling one of the pair of first disc members with a second one of the first disc members.

In the damper disc assembly described above, when torque is applied to the pair of first disc members, the torque is transmitted to the second disc member through the elastic members. When a twist vibration is applied to the pair of first disc members, the pair of first disc members and the second disc member are rotated relative to each other in the circumferential direction through the elastic members. When the relative twist angle between the first disc members and the second disc member is increased to a predetermined degree during the transmission of torque in response to vibration or the like, the plate coupler protrusions contact one end of the cutaway formed in the outer circumferential edge of the second disc member, in the circumferential direction. Thus, the relative rotation between the pair of first disc members and the second disc member is limited. In this case, the conventional stop pins are dispensed with, and the pair of first disc members are coupled with each other by the plate coupler while limiting the relative twist angle between the first disc members and the second disc member. Since the width of the plate coupler in the circumferential direction may be reduced in comparison with a configuration which includes stop pins, the relative twist angle may be increased in comparison with the conventional structure with stop pins.

Since a width of the projections in the circumferential direction is reduced in comparison with the configuration which uses stop pins, the relative twist angle may be increased in comparison with the conventional structure.

Since the coupler portions of the plate coupler are in the form of a sleeve, the overall structure is integral in the circumferential direction to enhance the mechanical strength.

DESCRIPTION OF THE PREFERRED EMBODIMENTS

The present invention will now be described with reference to the accompanying drawings.

Figure 1:
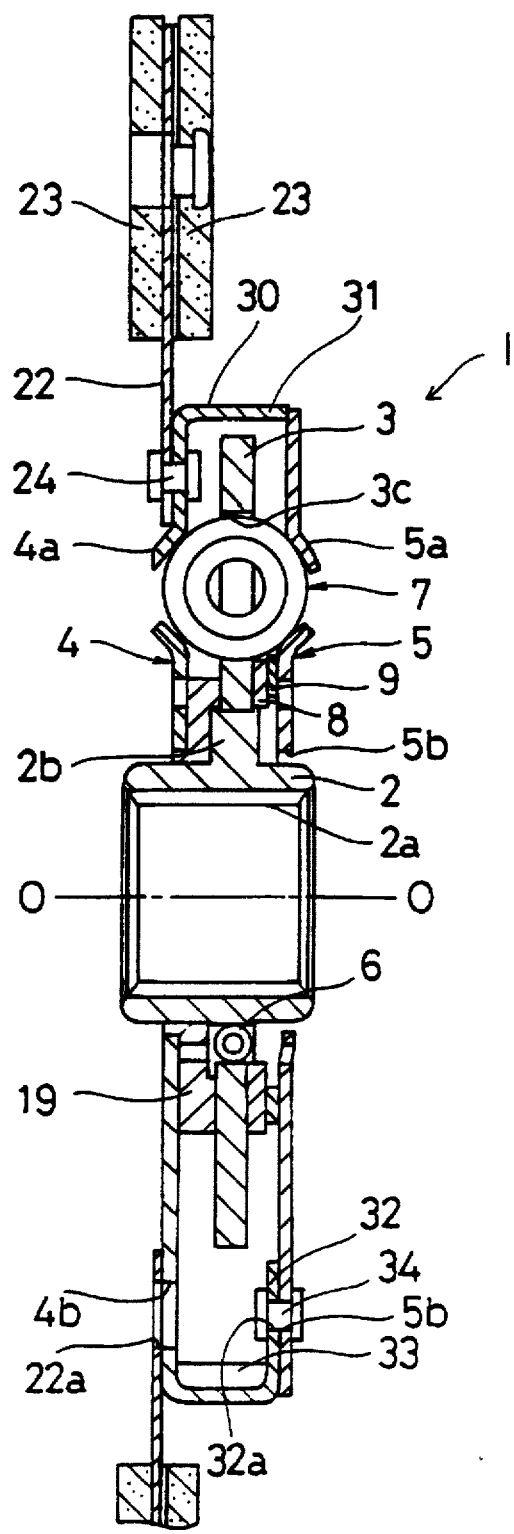
FIG. 1 is a fragmentary, schematic side sectional view showing a clutch disc assembly according to one embodiment of the invention.

FIG. 1 shows a clutch disc assembly 1 according to one embodiment of the invention, for selectively transmitting torque from an engine (not shown) disposed in the left side of FIG. 1 to a transmission (not shown) disposed in the right side of FIG. 1. In FIG. 1, line 0—0 indicates a rotary axis of the clutch disc assembly 1. R1 direction in FIG. 2 indicates a rotational direction of the clutch disc assembly 1. With respect to FIG. 1, the portion of the drawing to the left of the clutch disc assembly 1 will herein after be referred to as the engine side of FIG. 1, and the portion of the drawing to the right of the clutch disc assembly 1 will be referred to as the transmission side of FIG. 1.

Figure 2:
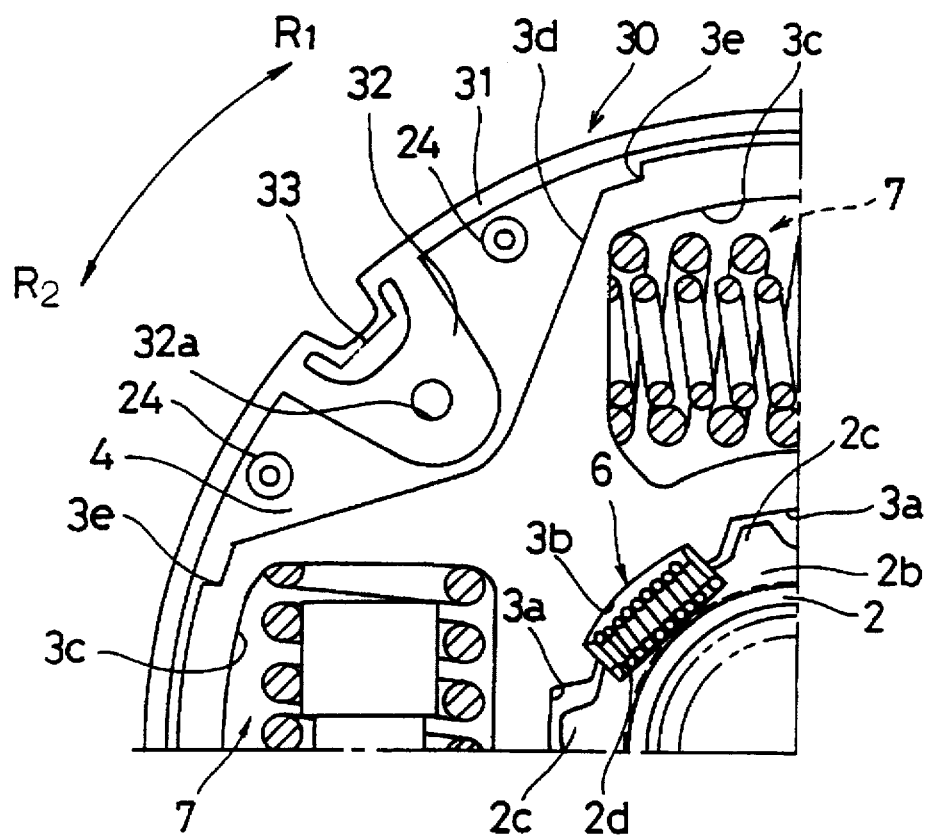
FIG. 2 is a fragmentary end view of the clutch disc assembly depicted in FIG. 1, shown in FIG. 2 with a plate coupler.

A hub 2 is configured to be coupled with a transmission input shaft (not shown) of the transmission (not shown), the hub being disposed at the center of the clutch disc assembly 1. The hub 2 has a spline hole 2a at the center. Also, the hub 2 has a small flange portion 2b which extends radially outwardly from the hub 2. A plurality of projections 2c are formed at equal spaced apart interval in the circumferential direction on the outer circumferential portion of the flange portion 2b. As shown in FIG. 2, receiving portions 2d for receiving both ends of small coil springs 6 (described in greater detail below) are cut and formed at two diametrically opposite positions of the flange portions 2b.

A separate flange 3 is disposed about the outer circumference of the projections 2c of the hub 2. The separate flange 3 is in the form of a disc-like plate. Cutaways 3a are formed at positions corresponding to the projections 2c of the hub 2 on the inner circumferential side of the separate flange 3. A predetermined gap is defined between the cutaways 3a and the projections 2c in the circumferential direction, so that the hub 2 and the separate flange 3 may be rotated relative to each other within a predetermined angular range. In FIG. 2, the clutch disc assembly 1 is shown in an unstressed state with no torsional forces applied. In the state shown in FIG. 2, the projections 2c are positioned off center within the cutaways 3a in the R2 direction (opposite to the rotational direction).

Receiving portions 3b are formed on the inner circumferential side of the separate flange 3 at two positions corresponding to the positions of the receiving portions 2d of the hub 2. The small coil springs 6 are disposed in these receiving portions 2d and 3b and elastically couple the hub 2 and the separate flange 3 together.

In a radially intermediate portion of the separate flange 3 is formed with four window holes 3c which extend in the circumferential direction. Cutaways 3d are formed radially inwardly in the outer circumferential edge between adjacent window holes 3c. As is shown in FIG. 2, each of the cutaways 3d has a gradually increasing radially inward depth going from the circumferential ends towards the center thereof. Contact portions 3e are formed at each circumferential end of each cutaway 3d. Each contact portion 3e is a recess or stepped portion cut out of the separate flange 3.

A clutch plate 4 and a retaining plate 5 are disposed on opposite sides of the separate flange 3 and together define an output rotary member. Each of the plates 4 and 5 are generally a pair of disc-like members which are in engagement with the outer circumferential side of the hub 2 but are rotatable with respect to the hub 2.

A plate coupler 30 is formed integrally on the outer circumference of the clutch plate 4. The plate coupler 30 includes a sleeve portion 31 extending from the outer circumferential edge of the clutch plate 4 to the retaining plate 5, as is shown in FIG. 1. The plate coupler 30 is also formed with fastener portions 32 which extend radially inwardly from an end portion of the sleeve portion 31, stopper portions 33 extending radially inwardly from the sleeve portion 31 at positions corresponding to the fastener portions 32. The fastener portions 32 are formed at four positions which generally correspond to the position of the cutaways 3d between the window holes 3c of the separate flange 3. Holes 32a are formed in the fastener portions 32. The clutch plate 4 is fixed to the retaining plate 5 by rivets 34 that pass through the holes 32a and holes 5b of the retaining plate 5. Thus, the clutch plate 4 and the retaining plate 5 rotate together as a one-piece unit in the circumferential direction. Holes 4b are formed at four positions corresponding to the rivets 34 in the clutch plate 4. As can be observed in FIG. 2, the projections 33 are positioned to be cirumferencially aligned with the cutaway contact portions 3e of the separate flange 3 such that, upon rotation of the clutch plate 4 and retaining plate 5 with respect to the flange 3, there is no interference between the projection and the flange 3 until the projection 33 contacts the contact portions 3e.

An integral type cushioning plate 22 is fixed to an outer circumferential portion of the clutch plate 4 by rivets 24.

Frictional facings 23 are fixed to both sides of the cushioning plate 22. Holes 22a are formed in the cushioning plate 22 at positions corresponding to the holes 4b of the clutch plate 4. Further, a flywheel (not shown) on the engine side of FIG. 1, is disposed on the left side of the frictional facings 23 of FIG. 1. When the frictional facings 23 are pressed against the flywheel (not shown), the torque from the engine is transmitted to the clutch disc assembly 1.

Raised cut portions 4a and 5a which are raised axially outwardly are formed at positions corresponding to the window holes 3c of the separate flange 3 in the retaining plate 4 and the clutch plate 5, respectively. Large coil springs 7 are disposed in the raised cut portions 4a and 5a and the window holes 3c of the separate flange 3. The large coil springs 7 are larger in wire diameter and coil diameter and more rigid than the small coil springs 6.

A friction washer 8 and a conical spring 9 are interposed between the inner circumferential portion of the retaining plate 5 and the inner circumferential portion of the separate flange 3. The conical spring 9 is interposed between the friction washer 8 and a radially extending surface of the retaining plate 5. The conical spring 9 is engaged with the retaining plate 5 and the friction washer 8 and urges the friction washer 8 into contact with an inner circumferential face of the separate flange 3.

A second friction washer 19 is fixed in a non-relatively rotatable manner to an inner radially extending surface of the clutch plate 4. The second friction washer 19 contacts an outer circumferential surface, sides of the inner circumferential portions of the separate flange 3 and the flange portion 2b and the projections 2c of the hub 2.

The operation of the clutch disc assembly 1 will be explained.

When the frictional facings 23 are pressed against the flywheel (not shown) on the engine side, the torque of the engine side is transmitted to the clutch plate 4 and the retaining plate 5. The torque is transmitted through the large coil springs 7, the separate flange 3 and the small coil springs 6 to the hub 2 and subsequently outputted to the shaft on the transmission (not shown).

When a twist vibration having a small shift angle is transmitted from the engine side to the clutch disc assembly 1, a relative rotation occurs between the plates 4 and 5 and the separate flange 3 and the hub 2. At this time, the small coil springs 6 are compressed in the circumferential direction. As a result, due to the low rigidity characteristics, the twist angle with a small shift angle is attenuated.

When a vibration having a large shift angle is transmitted to the clutch disc assembly 1, the separate flange 3 and the hub 2 are rotated together. A relative rotation occurs between these components and the plates 4 and 5. At this time, the large coil springs 7 are compressed in the circumferential direction, the first friction washer 8 is slidingly moved on the separate flange 3 to cause a large friction. In this case, the vibration with a large shift angle is effectively attenuated due to the high rigidity and large friction characteristics.

When the relative twist angle between the plates 4 and and the separate flange 3 is increased, then the projections 33 of the plate coupler 30 are brought into contact with the cutaway contact portions 3e of the separate flange 3. Namely, the relative rotation between the plates 4 and 5 and the separate flange 3 is stopped.

In this embodiment, the conventional stop pins are dispensed with and the relative rotation between the coupling of the plates 4 and 5 and the separate flange 3 is limited by the plate coupler 30. Accordingly, it is possible to sufficiently widen the relative twist angle between the plates 4 and 5 and the separate flange 3 in comparison with the conventional structure. In particular, since the projections 33 may be shortened in the circumferential length in comparison with the conventional stop pins, the projections 33 contributes to the increased relative twist angle. Furthermore, the contact portions 3e are provided in the separate flange 3 to thereby further increase the relative twist angle.

Since the plate coupler 30 is formed integrally in the circumferential direction with the sleeve portion 31, the plate coupler has a sufficient strength to withstand the torque transmitted via the fastener portions 32 and the projections 33.

The operation to assemble the clutch disc assembly 1 will now be explained. First of all, the cushioning plate 22 is fastened to the clutch plate 4 by a plurality of rivets 24. Subsequently, the components such as the hub 2, the separate flange 3, the large coil springs 7, the small coil springs 6, the second friction washer 19, the first friction washer 8 and the cone springs 9 are assembled into the clutch plate 4. Next, the retaining plate 5 is disposed on the clutch plate 4. At this time, the holes 5b of the retaining plate 5 are aligned with the holes 32a of the fasteners 32 of the plate coupler 30. In this state, the rivets 34 are inserted from the retaining plate 5 side into the holes 5b and the holes 32a. Here, the rivets 34 are deformed or caulked while pressing the retaining plate 5 against the clutch plate side. A punch used to caulk the rivets 34 may easily fit into and be withdrawn from the holes 22a of the cushioning plate 22 and the holes 4b of the clutch plate 4.

Figure 3:
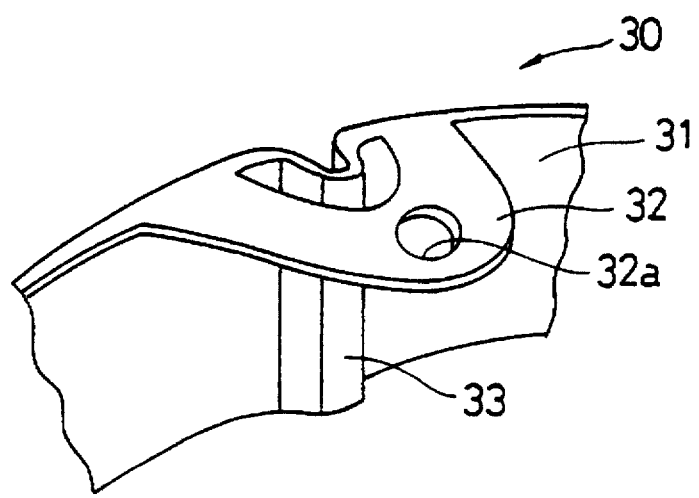
FIG. 3 is a fragmentary perspective view the plate coupler shown removed from the clutch disc assembly depicted in FIGS. 1 and 2.
Figure 4:
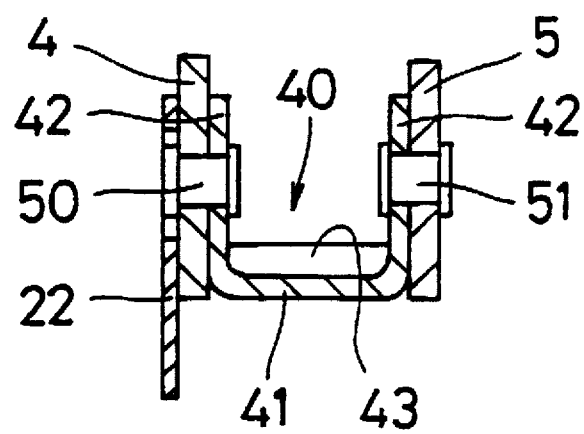
FIG. 4 is a fragmentary side sectional view showing a portion of a clutch disc assembly in accordance with an alternate embodiment of the present invention.

In an alternate embodiment of the present invention shown in FIG. 4, the configuration of the clutch disc assembly 1 is very similar to that shown in FIG. 1. Although the plate coupler 30 is integrally formed with the outer circumferential edge of the clutch plate 4 in FIG. 1, it is possible to make the plate coupler discrete and separate from the clutch plate 4 and the retaining plate 5. The plate coupler 40 shown in FIG. 4 includes a sleeve portion 41, fasteners 42 formed on both ends of the sleeve portion 41 and extending radially inwardly, and projections 43 extending radially inwardly from the sleeve portion 41. The projections 43 server generally the same function as the projections 33 described above with respect to the embodiment depicted in FIGS. 1–3.

In the embodiment depicted in FIG. 4, the fasteners 42 are fixed to the clutch plate 4 and the retaining plate 5 by rivets 50 and 51, respectively. In this case, the effect and advantage mentioned above may be ensured.

In still another alternative embodiment (not shown), it is possible to integrally form the plate coupler to the outer circumferential edge of the retaining plate. In this case, the fasteners are fixed to the clutch plate.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A damper disc assembly comprising:

a pair of first disc members facing each other;

a second disc member disposed between said pair of first disc members, concentric therewith, said second disc member having a generally annular shape and having at least two cutaways formed on an outer circumferential edge thereof extending in a circumferential direction, each of said cutaways having first and second contact ends that are circumferential spaced apart from one another by a first circumferential, length, a portion of said outer circumferential edge extending between said cutaways having a second circumferential length, said second circumferential length being approximately half as large as said first circumferential length;

at least one elastic member elastically connecting said first disc members and said second disc member in the circumferential direction; and a plate coupler coupling an outer circumferential portion of each of said pair of first disc members to each other, said plate coupler formed with a radially inwardly extending protrusion which extends into said cutaway of said second disc member, said inwardly extending protrusion having first and second circumferential sides, said first circumferential side being engageable with said first contact end of said cutaway in response to limited relative rotary displacement of said second disc member with respect to said first disc members, and said second circumferential side being engageable with said second contact end of said cutaway in response to limited relative rotary displacement of said second disc member with respect to said first disc members.

2. The damper disc assembly according to claim 1, wherein said plate coupler is a discrete member connected to each of said pair of first disc members.

3. The damper disc assembly according to claim 1, wherein said plate coupler comprises an annular sleeve extending from one of said pair of first disc members toward an outer circumferential edge of a second one of said pair of first disc members, said plate coupler being formed with fastener portions which extend radially inward from said annular sleeve, said fastener portions being fixed to said pair of first disc members.

4. The damper disc assembly according to claim 1, wherein said plate coupler is formed integrally with the outer circumferential portion of one of said pair of first disc members and extends axially therefrom.

5. The damper disc assembly according to claim 1, wherein said plate coupler comprises a plurality of fastener plates for coupling one of said pair of first disc members with a second one of said first disc members.

6. The damper disc assembly according to claim 1, wherein said second disc member is formed about a central hub.

7. The damper disc assembly according to claim 6, wherein each of said first disc members is formed with at least one first window and said second disc member is formed with at least one first window and said elastic member is disposed in said first windows.

8. The damper disc assembly according to claim 1 wherein said outer circumferential edge is formed with four of said cutaways, said cutaways being generally equally circumferentially spaced apart from one another.

9. The damper disc assembly according to claim 1 wherein said cutaways are generally equally circumferentially spaced apart from one another, and said first circumferential length is approximately 60° said second circumferential length is approximately 30°.

10. A damper disc assembly comprising:

a pair of first disc members opposing each other, each first disc member being formed with windows therein;

a hub having a radially extending flange extending therefrom, said flange defining a second disc member, said second disc member disposed between said pair of first disc members and also concentric therewith, said second disc member formed with at least two cutaways formed on an outer circumferential edge which extends a predetermined first circumferential length and also extend radially inwardly a predetermined distance, said second disc member also formed with a plurality of windows circumferentially between said cutaways, a portion of said outer circumferential edge extending between said cutaways defining a second circumferential length, said first circumferential length being approximately twice as large as said second circumferential length;

elastic members, at least one of said elastic members disposed in each of said windows in said first disc member and said windows in said second disc member for connecting said first disc members and said second disc member in the circumferential direction; and an annular plate coupler for coupling an outer circumferential portion of said pair of first disc members to each other, said plate coupler includes a radially inwardly extending protrusion that is configured to engage circumferentially opposite contact ends of said cutaway in response to relative rotary displacement between said first and second disc members.

11. The damper disc assembly according to claim 10, wherein said plate coupler is formed integrally with the outer circumferential portion of one of said pair of first disc members and extends axially therefrom.

12. The damper disc assembly according to claim 10, wherein said plate coupler comprises a plurality of fastener plates for coupling one of said pair of first disc members with a second one of said first disc members.

13. The damper disc assembly according to claim 10, wherein said plate coupler is a discrete member connected to each of said pair of first disc members.

14. The damper disc assembly according to claim 10, wherein said plate coupler comprises an annular sleeve extending from one of said pair of first disc members toward an outer circumferential edge of a second one of said pair of first disc members, said plate coupler being formed with fastener portions which extend radially inward from said annular sleeve, said fastener portions being fixed to said pair of first disc members.

15. The damper disc assembly according to claim 10 wherein said outer circumferential edge is formed with four of said cutaways, said cutaways being generally equally circumferentially spaced apart from one another.

16. The damper disc assembly according to claim 10 wherein said cutaways are generally equally circumferentially spaced apart from one another, and said first circumferential length is approximately 60° said second circumferential length is at least 20°.

* * * * *